US011066101B2

United States Patent
Hosono et al.

(10) Patent No.: US 11,066,101 B2
(45) Date of Patent: Jul. 20, 2021

(54) STEERING CONTROL DEVICE

(71) Applicant: JTEKT CORPORATION, Osaka (JP)

(72) Inventors: Hiroshi Hosono, Toyota (JP); Akira Nambu, Okazaki (JP); Tatsuya Suzuki, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 228 days.

(21) Appl. No.: 16/227,186

(22) Filed: Dec. 20, 2018

(65) Prior Publication Data

US 2019/0193789 A1 Jun. 27, 2019

(30) Foreign Application Priority Data

Dec. 25, 2017 (JP) .............................. JP2017-248178

(51) Int. Cl.
*B62D 15/02* (2006.01)
*B62D 5/00* (2006.01)
*B62D 5/04* (2006.01)

(52) U.S. Cl.
CPC ......... *B62D 15/0235* (2013.01); *B62D 5/008* (2013.01); *B62D 5/0421* (2013.01); *B62D 5/0442* (2013.01); *B62D 5/0466* (2013.01); *B62D 5/0481* (2013.01); *B62D 15/0215* (2013.01); *B62D 15/0245* (2013.01)

(58) Field of Classification Search
None
See application file for complete search history.

(56) References Cited

U.S. PATENT DOCUMENTS

2014/0311817 A1  10/2014  Kita et al.
2016/0272239 A1   9/2016  Kim
2016/0332660 A1*  11/2016  Sasaki .................... B62D 6/002

FOREIGN PATENT DOCUMENTS

JP    2013-086586 A    5/2013
JP    2014-210495 A    11/2014

OTHER PUBLICATIONS

May 31, 2019 Extended Search Report issued in European Application No. 18215309.8.

* cited by examiner

*Primary Examiner* — Genna M Mott
(74) *Attorney, Agent, or Firm* — Oliff PLC

(57) ABSTRACT

A steering angle calculating circuit includes a first neutral point calculating circuit, a second neutral point calculating circuit, and an absolute angle calculating circuit. The first neutral point calculating circuit calculates a motor neutral point ($\theta m01$), based on a steering angle detected by a steering sensor and a rotation angle of a motor detected by the relative angle sensor, when a drive source for driving a vehicle is started. The second neutral point calculating circuit calculates a motor neutral point when the steering angle detected by the steering sensor falls within a predetermined angle range in which a specific stroke with respect to the steering angle is constant. After the motor neutral point is calculated by the second neutral point calculating circuit, the absolute angle calculating circuit calculates the steering angle as an absolute angle, using the motor neutral point calculated by the second neutral point calculating circuit.

5 Claims, 6 Drawing Sheets

STEERING CONTROL DEVICE

INCORPORATION BY REFERENCE

The disclosure of Japanese Patent Application No. 2017-248178 filed on Dec. 25, 2017 including the specification, drawings and abstract, is incorporated herein by reference in its entirety.

BACKGROUND OF THE INVENTION

1. Field of the Invention

The present invention relates to a steering control device.

2. Description of the Related Art

There is known an electric power steering system (hereinafter referred to as an "EPS") that assists in steering by applying motor torque to a steering mechanism of a vehicle. This type of EPS is disclosed, for example, in Japanese Patent Application Publication No. 2014-210495 (JP 2014-210495 A). The steering mechanism has a variable gear ratio rack and pinion. The rotation of a pinion shaft interlocked with the operation of a steering wheel is converted into a reciprocating motion of a rack shaft, so that the steered angle of steered wheels is changed. A control device of the EPS controls the current to be supplied to the motor, in accordance with steering torque detected by a torque sensor. The control device also performs compensation control, such as steering return control that returns the steering wheel to the neutral position, based on a steering angle detected by an absolute angle sensor used as a steering sensor.

An absolute angle sensor used as a steering sensor often has a lower resolution than a relative angle sensor such as a resolver that detects a rotation angle of the motor. Here, a relative angle sensor is a sensor configured to output a detection angle within a predetermined range corresponding to the rotation angle of the motor when the angle falls within a predetermined motor rotation angle range, and the detection angle returns from one boundary value to the other boundary value when the angle exceeds the predetermined motor rotation angle range. Meanwhile, an absolute angle sensor is a sensor configured such that the detection angle continues to increase or decrease even when the detection angle exceeds a predetermined motor rotation angle range. Therefore, the control device calculates a steering angle as an absolute angle, using the rotation angle of the motor detected by a relative angle sensor. Specifically, the control device first calculates a conversion value by converting a steering angle detected by an absolute angle sensor into a rotation angle of the motor, taking into account a specific stroke. A specific stroke is the moving distance of the rack shaft during one rotation of the pinion shaft. Subsequently, the control device calculates a motor neutral point by subtracting the conversion value from a rotation angle of the motor detected by a relative angle sensor. A motor neutral point indicates a rotation angle of the motor corresponding to a steering neutral position of the steering wheel. Then, the control device calculates a steering angle as an absolute angle, based on the motor neutral point and the rotation angle of the motor detected by the relative angle sensor, and performs the compensation control described above, using the calculated steering angle (absolute steering angle).

However, in the EPS disclosed in JP 2014-210495 A, the theoretical relationship between the steering angle detected by the absolute angle sensor and the specific stroke at the time of calculating the conversion value may differ from the actual relationship at the time when the steering wheel is actually operated, due to the dimensional tolerance or assembly tolerance of the component members of the EPS. Therefore, the motor neutral point calculated based on the conversion value may differ from the motor neutral point at the time when the steering wheel is actually steered to the steering neutral position. Accordingly, the steered angle based on the motor neutral point calculated using the conversion value may differ from the actual steering angle.

SUMMARY OF THE INVENTION

An object of the present invention is to provide a steering control device capable of securing the calculation accuracy of an absolute steering angle based on a rotation angle of a motor detected by a relative angle sensor.

According to an aspect of the invention, there is provided a steering control device that controls a motor configured to generate power to be applied to a steering mechanism having a variable gear ratio rack and pinion, based on a command value calculated in accordance with a steering state, the steering control device including: a first calculating circuit that calculates a first component of the command value in accordance with a steering torque; a second calculating circuit that calculates a second component of the command value, as a compensation control amount for the first component, based on a steering angle; and a third calculating circuit that calculates a motor neutral point indicating a rotation angle of the motor corresponding to a steering neutral position, by subtracting a conversion value from a rotation angle of the motor detected by a relative angle sensor, the conversion value being calculated by converting a steering angle detected by an absolute angle sensor into a rotation angle of the motor, taking into account a specific stroke, and calculates the steering angle to be used in the second calculating circuit as an absolute angle, based on the calculated motor neutral point and the rotation angle of the motor detected by the relative angle sensor; wherein the third calculating circuit calculates the motor neutral point when the steering angle detected by the absolute angle sensor falls within a predetermined angle range in which a difference between a theoretical specific stroke and an actual specific stroke with respect to the steering angle falls within an allowable range for the steering angle.

With this configuration, the motor neutral point is calculated when the steering angle detected by the absolute angle sensor falls within a predetermined angle range in which the difference between the theoretical specific stroke and the actual specific stroke falls within an allowable range for the steering angle. Therefore, the difference between the motor neutral point calculated using the conversion value and the actual motor neutral point also falls within an allowable range. Accordingly, by using the motor neutral point calculated by the third calculating circuit, it is possible to secure the calculation accuracy of the absolute steering angle based on the rotation angle of the motor detected by the relative angle sensor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
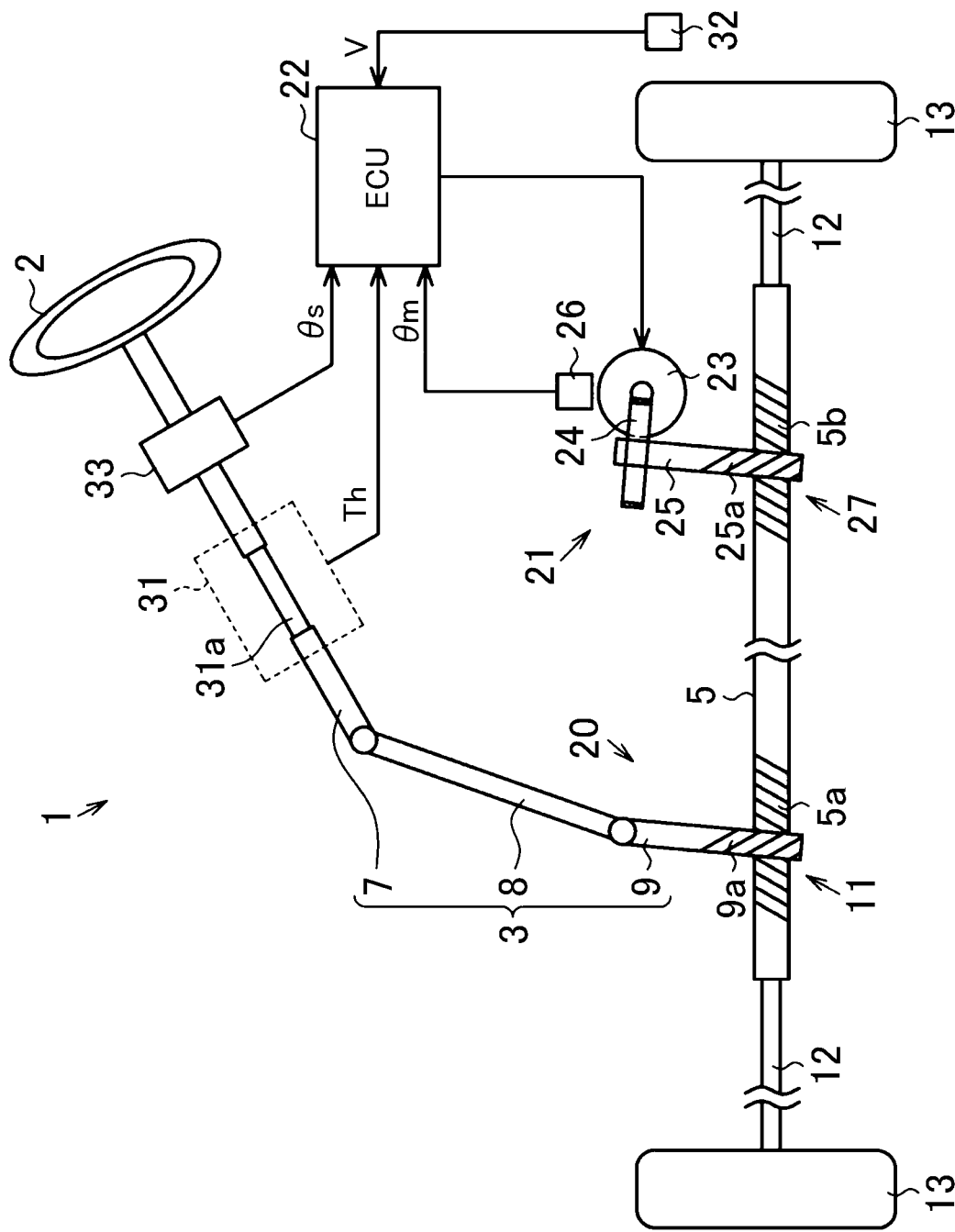
FIG. 1 is a schematic configuration diagram of an electric power steering system on which a steering control device of an embodiment is mounted.

Hereinafter, an embodiment of the present invention will be described. In the present embodiment, a steering control device according to the present invention is embodied as a control device for an electric power steering system (hereinafter referred to as an "EPS"). As illustrated in FIG. 1, an EPS 1 includes a steering mechanism 20 that changes the traveling direction of the vehicle based on steering by the driver, a steering assist mechanism 21 that assists the driver in steering, and an electronic control unit (ECU) 22 serving as a steering control device that controls the operation of the steering assist mechanism 21.

As illustrated in FIG. 1, the steering mechanism 20 includes a steering shaft 3 to which a steering wheel 2 is fixed, and a rack shaft 5 that reciprocates in the axial direction in accordance with the rotation of the steering shaft 3. The steering shaft 3 is formed by connecting a column shaft 7, an intermediate shaft 8, and a pinion shaft 9, in this order from the steering wheel 2 side. The rack shaft 5 and the pinion shaft 9 are disposed to cross each other. A first rack-and-pinion mechanism 11 is formed by meshing pinion teeth 9a provided on the pinion shaft 9 with first rack teeth 5a provided on the rack shaft 5. Knuckles of steered wheels 13 are coupled to the opposite ends of the rack shaft 5 via tie rods 12. Accordingly, the rotation of the steering shaft 3 interlocked with the operation of the steering wheel 2 is converted into an axial reciprocating motion of the rack shaft 5 by the first rack-and-pinion mechanism 11. The reciprocating motion is transmitted to the knuckles via the tie rods 12, so that the steered angle of the steered wheels 13 is changed.

The first rack-and-pinion mechanism 11 is of a variable gear ratio type. That is, the specifications of the first rack teeth 5a (such as tooth pitch and pressure angle) are set at a part of the rack shaft 5 provided with the first rack teeth 5a such that the specific stroke continuously increases from around the center corresponding to the steering neutral position of the steering wheel 2 toward the stroke ends at the right and left steering limit positions. Here, a specific stroke is the moving distance of the rack shaft 5 during one rotation of the pinion shaft 9 (steering wheel 2). The relationship between the steering angle $\theta s$ and the specific stroke is as follows.

Figure 2:
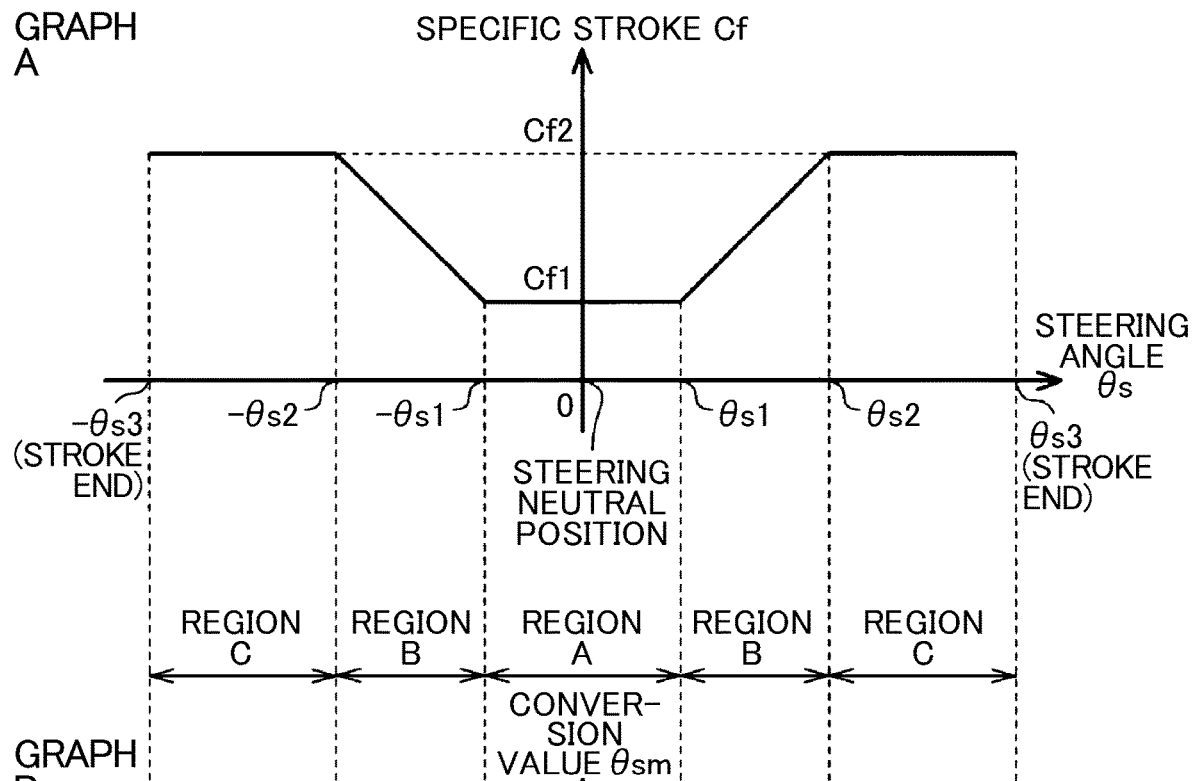
FIG. 2 illustrates a graph A representing the relationship between a steering angle and a specific stroke, and a graph B representing the relationship between a steering angle and a conversion value.
Figure 2:
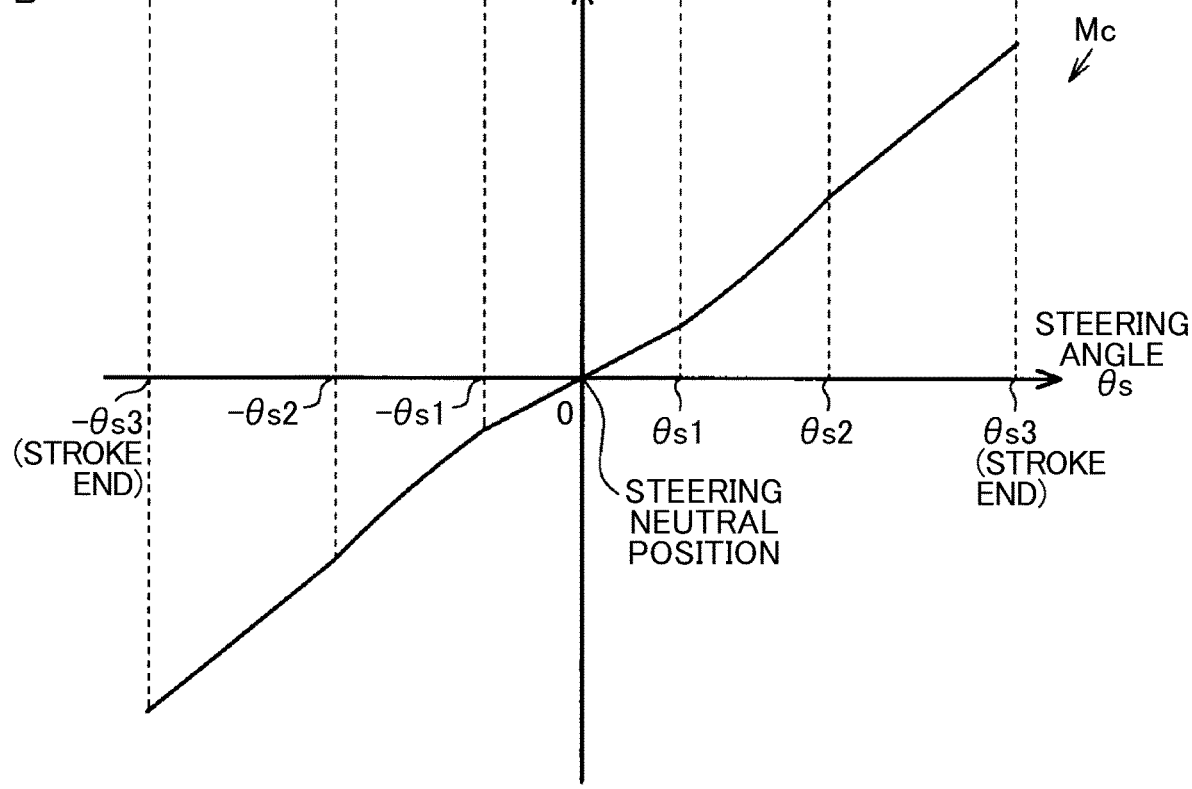

As illustrated in a graph A of FIG. 2, in a region A in the vicinity of the steering neutral position where the absolute value of the steering angle $\theta s$ is less than or equal to a first steering angle $\theta s1$, a specific stroke Cf is set to a first specific stroke Cf1 (constant). In a region B where the absolute value of the steering angle $\theta s$ is greater than the first steering angle $\theta s1$ and is less than or equal to a second steering angle $\theta s2$, the specific stroke Cf is set to gradually increase as the absolute value of the steering angle $\theta s$ increases. In a region C in the vicinity of the stroke ends where the absolute value of the steering angle $\theta s$ is greater than the second steering angle $\theta s2$ and is less than or equal to a third steering angle $\theta s3$, the specific stroke Cf is set to a second specific stroke Cf2 (constant). The second specific stroke Cf2 has a value greater than the first specific stroke Cf1.

In the graph A of FIG. 2, the steering angle $\theta s$ when steered to the right with respect to the steering neutral position ($\theta s=0$) is represented by a positive value, and the steering angle $\theta s$ when steered to the left is represented by a negative value. Since the specific stroke Cf with respect to the steering angle $\theta s$ is set as described above, the steered angle of the steered wheels 13 changes more greatly as the absolute value of the steering angle $\theta s$ increases. Therefore, it is possible to secure the operability when traveling straight or traveling at a high speed, and to improve the operability of the steering wheel 2 during stationary steering or when traveling at a low speed.

As illustrated in FIG. 1, the steering assist mechanism 21 includes a motor 23 serving as a drive power source, and a pinion shaft 25 coupled to the motor 23 via a speed reduction mechanism 24 such as a worm and wheel. The motor 23 is, for example, a three-phase brushless motor. The motor 23 is provided with a relative angle sensor 26 such as a resolver. The relative angle sensor 26 detects a rotation angle $\theta m$ of the motor 23 as a relative angle in the range of 360°. The rack shaft 5 and the pinion shaft 25 are disposed to cross each other. Pinion teeth 25a provided on the pinion shaft 25 and second rack teeth 5b provided on the rack shaft 5 mesh each other, thereby forming a second rack-and-pinion mechanism 27 serving as a power conversion mechanism. The speed reduction mechanism 24 reduces the speed of rotation of the motor 23, and a rotational force of the motor 23 is transmitted at the reduced speed to the pinion shaft 25. The rotation of the of the pinion shaft 25 is converted into an axial reciprocating motion of the rack shaft 5 by the second rack-and-pinion mechanism 27, thereby assisting in operating the steering wheel 2. The specifications of the second rack teeth 5b are set to be the same across a region of the rack shaft 5 where the second rack teeth 5b are provided.

The ECU 22 controls the operation of the motor 23 based on the detection results of on-board sensors. Examples of on-board sensors include a torque sensor 31, a vehicle speed sensor 32, and a steering sensor 33, other than the relative angle sensor 26 described above. The torque sensor 31 includes a torsion bar 31a disposed on the column shaft 7. The torque sensor 31 detects a steering torque Th applied to the steering shaft 3, based on a torsion angle of the torsion bar 31a. The vehicle speed sensor 32 detects a vehicle speed V representing the travel speed of the vehicle. The steering sensor 33 is disposed at a part of the column shaft 7 between the torque sensor 31 and the steering wheel 2. The steering sensor 33 is an absolute angle sensor, and detects a steering angle $\theta s$ representing the rotation angle of the steering wheel 2 (steering shaft 3) as an absolute angle in a range exceeding 360°.

The ECU 22 calculates a target assist force, based on the vehicle speed V and the steering torque Th, and controls power supply to the motor 23 such that the steering assist mechanism 21 generates the target assist force. Further, the ECU 22 calculates an absolute steering angle, based on the steering angle $\theta s$ detected by the steering sensor 33 and the rotation angle $\theta m$ of the motor 23 detected by the relative angle sensor 26, and performs compensation control for achieving a better steering feeling, using the calculated absolute steering angle.

Figure 3:
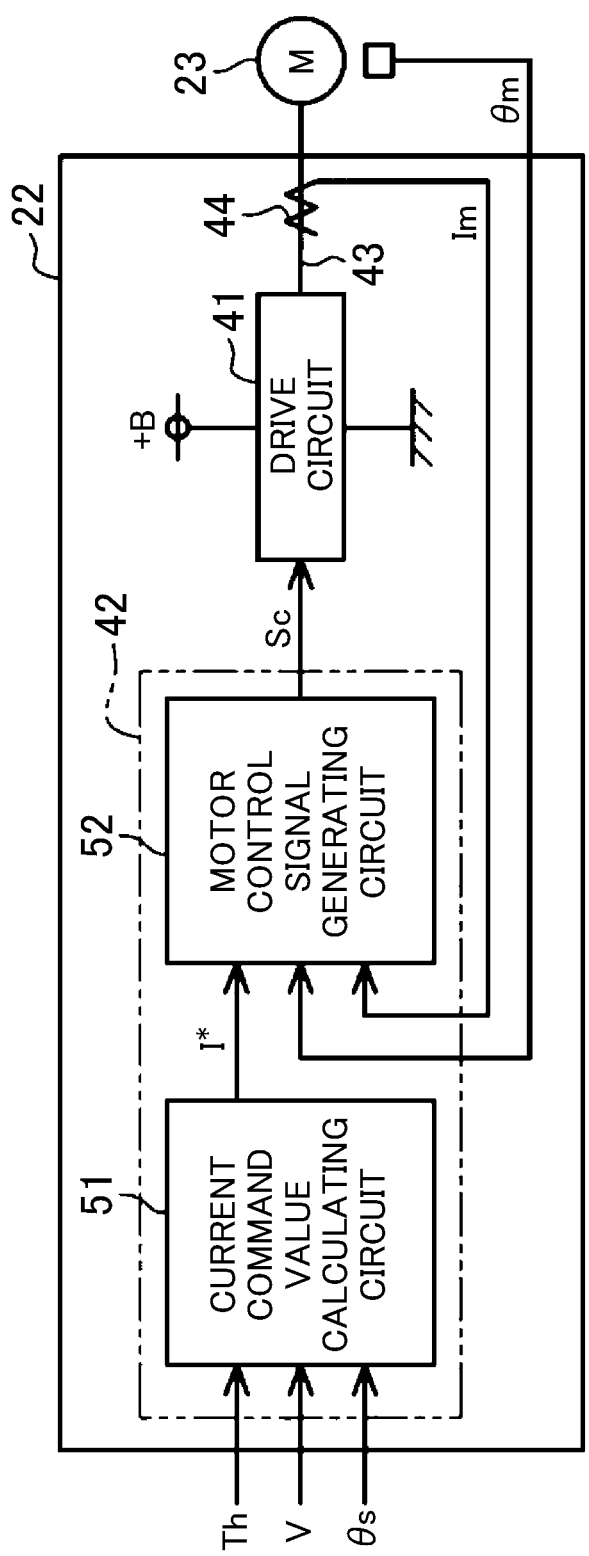
FIG. 3 is a control block diagram of the steering control device according to the embodiment.

Next, the ECU 22 will be described in detail. As illustrated in FIG. 3, the ECU 22 includes a drive circuit (inverter circuit) 41 and a micro-processing unit (MPU) 42.

The drive circuit 41 converts DC power supplied from a battery (+B), which is a DC power supply, into three-phase AC power, based on a motor control signal Sc (PWM drive signal) generated by the MPU 42. The resulting three-phase AC power is supplied to the motor 23 via a power supply path 43 of each phase. A current sensor 44 is provided in the power supply path 43 of each phase. The current sensor 44 detects an actual current value Im of a current that flows through the power supply path 43 of each phase.

The MPU 42 includes a current command value calculating circuit 51 and a motor control signal generating circuit 52. The current command value calculating circuit 51 calculates a current command value I* based on the steering torque Th and the vehicle speed V. The current command value I* is a target value of the current that is supplied to the motor 23 and that is required to generate an appropriate amount of target assist force corresponding to the steering torque Th and the vehicle speed V. The motor control signal generating circuit 52 performs feedback control of a current based on the current command value I*, the actual current value Im, and the rotation angle θm of the motor 23, such that the actual current value Im follows the current command value I*. The motor control signal generating circuit 52 calculates a deviation between the current command value I* and the actual current value Im, and generates a motor control signal Sc so as to eliminate the deviation. When a current corresponding to the motor control signal Sc is supplied to the motor 23 via the drive circuit 41, the motor 23 generates a rotational force corresponding to the target assist force.

Figure 4:
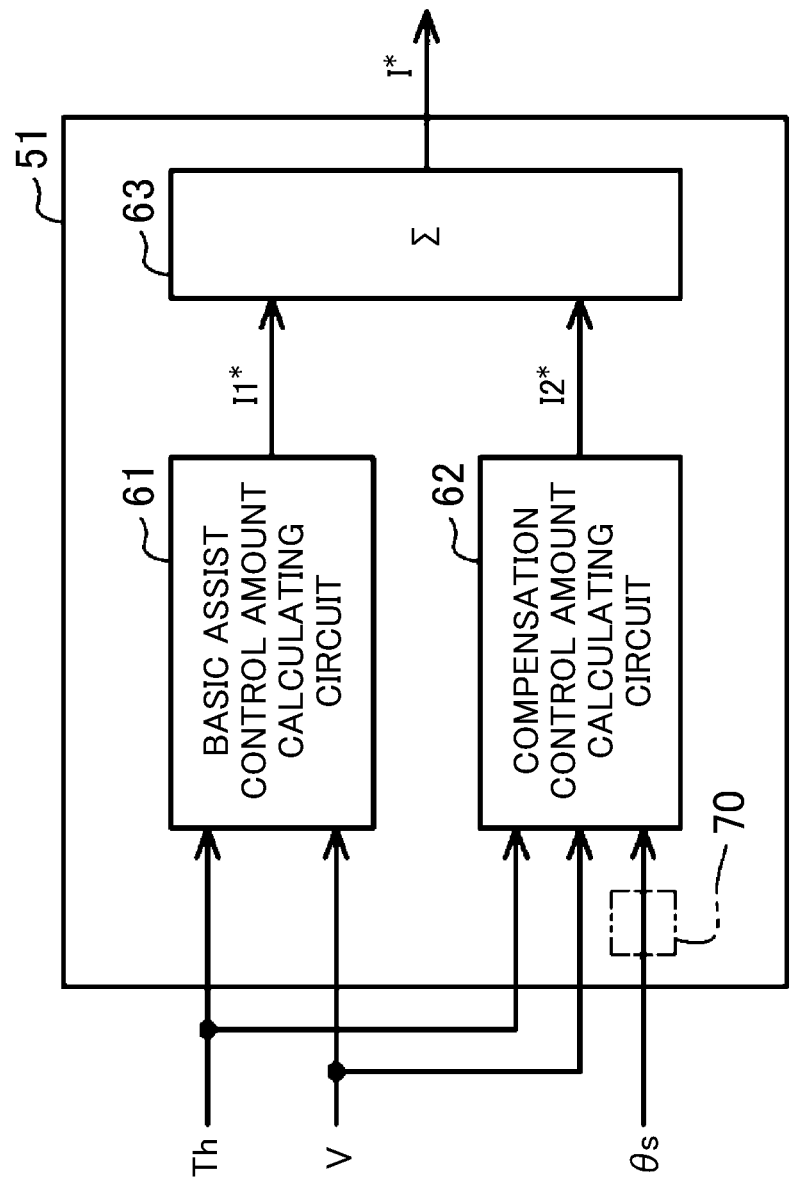
FIG. 4 is a control block diagram of a current command value calculating circuit according to the embodiment.

Next, the current command value calculating circuit 51 will be described in detail. As illustrated in FIG. 4, the current command value calculating circuit 51 includes a basic assist control amount calculating circuit 61, a compensation control amount calculating circuit 62, and an adder 63.

The basic assist control amount calculating circuit 61 calculates a basic assist control amount I1* (current value) as a first component of the current command value I*, based on the steering torque Th and the vehicle speed V. The basic assist control amount I1* is a basic component for generating an appropriate amount of target assist force corresponding to the steering torque Th and the vehicle speed V. The basic assist control amount calculating circuit 61 calculates the basic assist control amount I1*, using an assist characteristic map stored in a storage device (not illustrated) of the ECU 22. The assist characteristic map is a vehicle-speed sensitive three-dimensional map for calculating the basic assist control amount I1* based on the steering torque Th and the vehicle speed V, and is set such that the value (absolute value) of the calculated basic assist control amount I1* increases as the absolute value of the steering torque Th increases, or as the vehicle speed V decreases.

The compensation control amount calculating circuit 62 performs compensation control on the basic assist control amount I1* in order to achieve a better steering feeling. Examples of compensation control include steering return control that returns the steering wheel 2 to the steering neutral position.

The compensation control amount calculating circuit 62 calculates a compensation control amount I2* (current value) for compensating for the return characteristics of the steering wheel 2, based on the steering torque Th, the vehicle speed V, and the steering angle θs (or a steering speed ωs). The compensation control amount I2* is a second component of the current command value I*.

The adder 63 calculates a current command value I* by adding the compensation control amount I2* to the basic assist control amount I1* so as to correct the basic assist control amount I1*. Excess and deficiency of self-aligning torque due to a road surface reaction force is compensated for by correcting the basic assist control amount I1* using the compensation amount I2*. This is because an assist force in the direction of returning the steering wheel 2 to the steering neutral position is generated in accordance with the compensation amount I2*.

The absolute angle sensor used as the steering sensor 33 often has a lower resolution than the relative angle sensor 26 that detects the rotation angle θm of the motor 23. Therefore, as indicated by a long dashed double-short dashed line in FIG. 4, the current command value calculating circuit 51 includes a steering angle calculating circuit 70. The steering angle calculating circuit 70 calculates an absolute steering angle based on the rotation angle θm of the motor 23 detected by the relative angle sensor 26. This absolute steering angle is a steering angle to be used in the compensation control amount calculating circuit 62, and is calculated as an absolute angle in a range exceeding 360°. The compensation control amount calculating circuit 62 calculates the compensation control amount I2*, using the absolute steering angle calculated by the steering angle calculating circuit 70.

Figure 5:
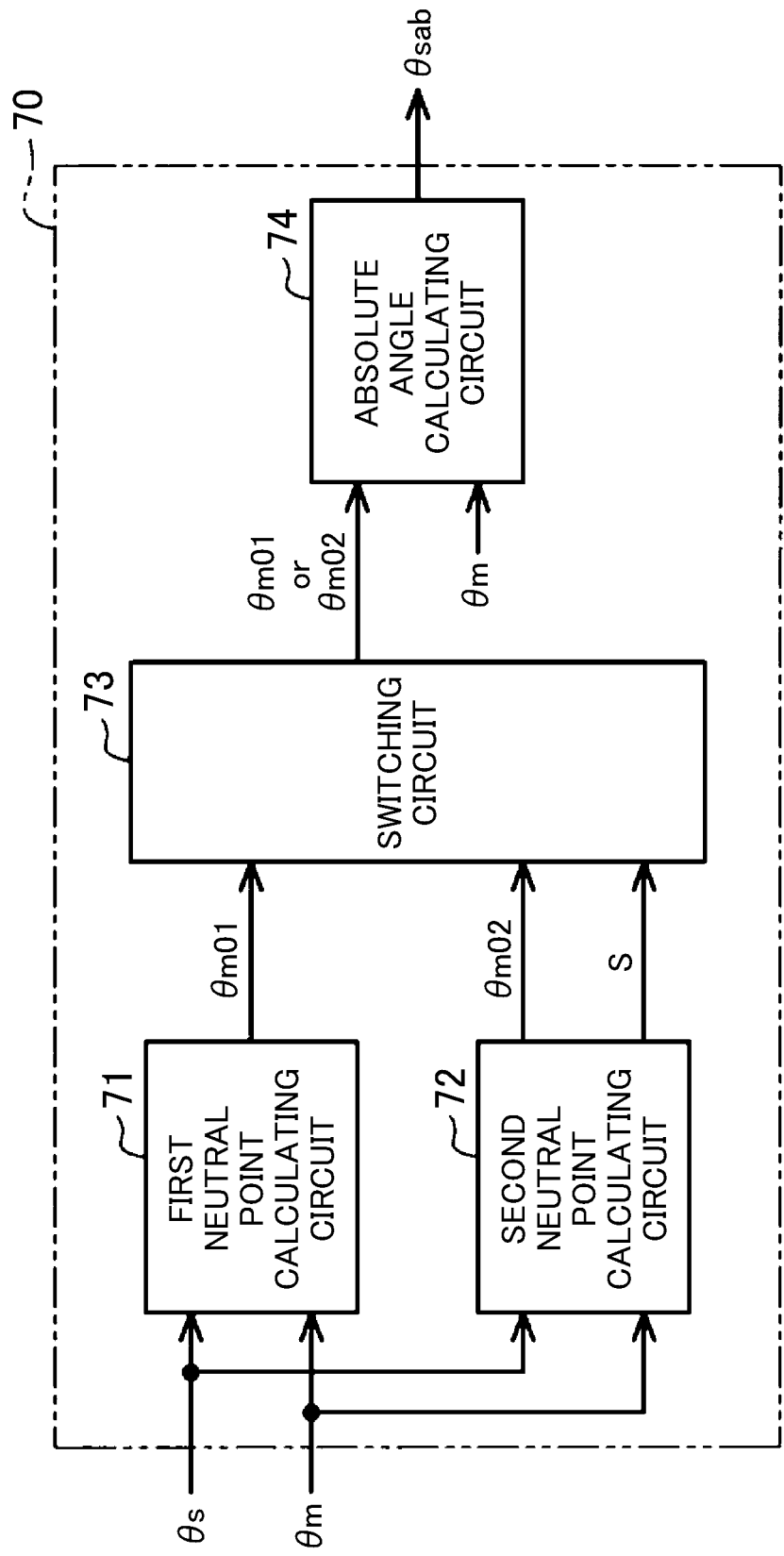
FIG. 5 is a control block diagram of a steering angle calculating circuit according to the embodiment.

Next, the steering angle calculating circuit 70 will be described in detail. As illustrated in FIG. 5, the steering angle calculating circuit 70 includes a first neutral point calculating circuit 71, a second neutral point calculating circuit 72, a switching circuit 73, and an absolute angle calculating circuit 74.

Immediately after the drive source for driving the vehicle is started, the first neutral point calculating circuit 71 calculates a motor neutral point θm01, using the steering angle θs detected by the steering sensor 33 and the rotation angle θm of the motor 23 detected by the relative angle sensor 26. The motor neutral point θm01 indicates the rotation angle θm of the motor 23 corresponding to the steering angle θs (steering angle neutral point) when the steering wheel 2 is located at the steering neutral position while the vehicle is traveling straight. The first neutral point calculating circuit 71 calculates the motor neutral point θm01, using a conversion map stored in a storage device (not illustrated) of the ECU 22.

As illustrated in a graph B of FIG. 2, a conversion map Mc defines the relationship between the steering angle θs detected by the steering sensor 33 and a conversion value θsm. The conversion value θsm is a value obtained by converting the steering angle θs detected by the steering sensor 33 into the rotation angle θm of the motor 23, taking into account the theoretical specific stroke Cf. The conversion value θsm is obtained by multiplying the steering angle θs by the ratio of the rotation amount of the motor 23 with respect to the rotation amount of the steering shaft 3 at that rotation angle θs.

The characteristics of the conversion map Mc are as follows. In the region A where the specific stroke Cf is the first specific stroke Cf1 (constant), the absolute value of the conversion value θsm linearly increases in accordance with the first specific stroke Cf1 as the absolute value of the steering angle θs increases. In the region B where the specific stroke Cf continuously increases as the absolute value of the steering angle θs increases, the absolute value of the conversion value θsm non-linearly increases as the absolute value of the steering angle θs increases. This is because the ratio of the rotation amount of the motor 23 with respect to the rotation amount of the steering shaft 3 changes in accordance with the value of the specific stroke Cf. In the region C where the specific stroke Cf is the second specific stroke Cf2 (constant), the absolute value of the conversion value θsm linearly increases in accordance with the second specific stroke Cf2 as the absolute value of the steering angle θs increases.

The first neutral point calculating circuit 71 calculates the motor neutral point θm01, by subtracting the conversion value θsm obtained based on the conversion map Mc from the rotation angle θm of the motor 23 detected by the relative angle sensor 26, as illustrated by the following expression (A). However, after calculating the motor neutral point θm01 once, the first neutral point calculating circuit 71 stops calculation of the motor neutral point θm01.

$$\theta m01 = \theta m - \theta sm \quad (A)$$

In this manner, since the motor neutral point θm01 is calculated taking into account that the specific stroke Cf changes in accordance with the steering angle θs, it is theoretically possible to secure the calculation accuracy of the motor neutral point θm01, regardless of the magnitude of the steering angle θs when calculating the motor neutral point θm01. That is, the motor neutral point θm01 calculated based on the above expression (A) has a value approximated to the rotation angle θm of the motor 23 (the actual motor neutral point) at the time when the steering wheel 2 is actually steered to the steering neutral position.

However, immediately after the drive source for driving the vehicle is started, the first neutral point calculating circuit 71 calculates the motor neutral point θm01, regardless of the magnitude of the steering angle θs detected by the steering sensor 33. This raises the following concern.

Figure 6:
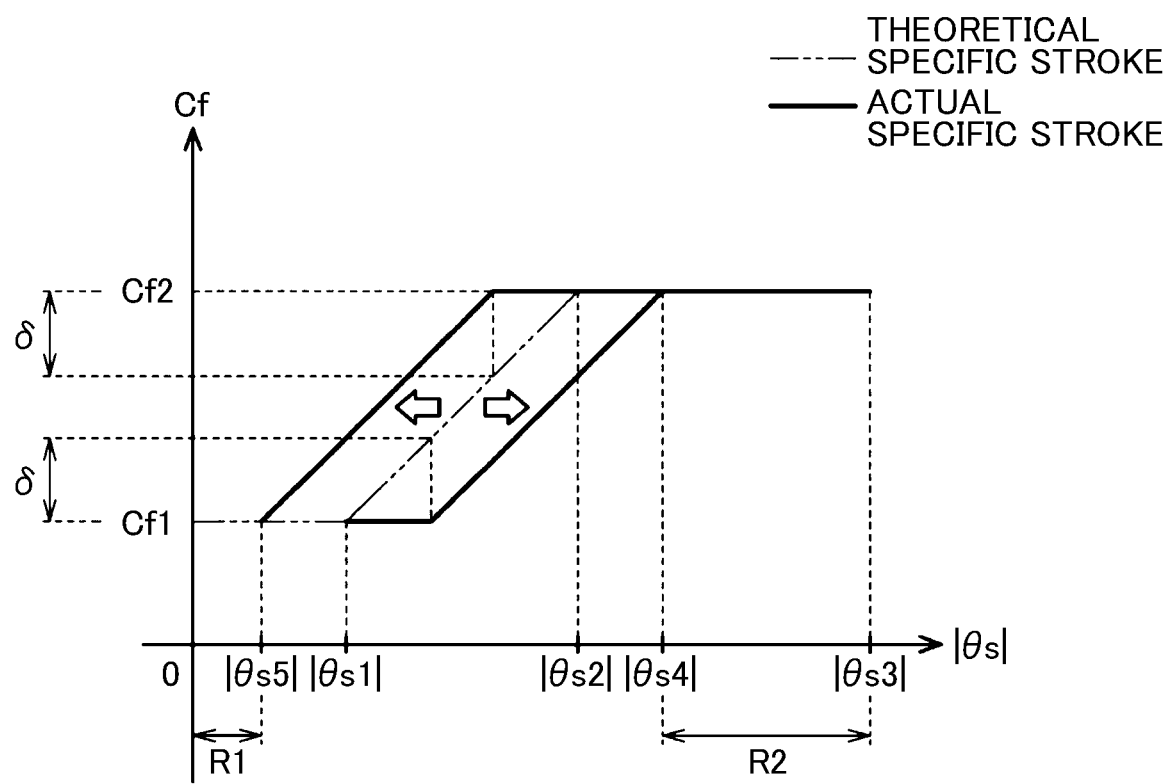
FIG. 6 is a graph illustrating the relationship between a steering angle and a specific stroke according to the embodiment.

As illustrated in the graph of FIG. 6, the actual relationship between the steering angle θs and the specific stroke Cf indicated by the continuous line in the graph of FIG. 6 may differ from the theoretical relationship indicated by the long dashed double-short dashed line in FIG. 6, due to the dimensional tolerance or assembly tolerance of the component members of the EPS 1. In particular, in the region where the specific stroke Cf varies with the steering angle θs (the region B in the graph A of FIG. 2), the influence of the dimensional tolerance or assembly tolerance of the component members of the EPS 1 on the specific stroke Cf is greater.

Here, the conversion map Mc defines the relationship between the steering angle θs detected by the steering sensor 33 and the conversion value θsm, which is obtained by converting the steering angle θs taking into account the theoretical specific stroke Cf with respect to the steering angle θs. Therefore, the motor neutral point θm01 obtained using the conversion value θsm based on the conversion map Mc may differ from the actual motor neutral point, due to the dimensional tolerance or assembly tolerance of the component members of the EPS 1.

In view of this, the steering angle calculating circuit 70 includes the second neutral point calculating circuit 72 and the switching circuit 73. Similar to the first neutral point calculating circuit 71, the second neutral point calculating circuit 72 calculates a motor neutral point θm02 based on the above expression (A), using the conversion map Mc. However, the second neutral point calculating circuit 72 calculates the motor neutral point θm02 when the steering angle θs detected by the steering sensor 33 reaches a value in the angle range in which the specific stroke Cf does not change with respect to the steering angle θs.

As illustrated in the graph of FIG. 6, when the absolute value of the steering angle θs is less than the absolute value of a fifth steering angle θs5 (<|θs1|), and when the absolute value of the steering angle θs is greater than or equal to the absolute value of a fourth steering angle θs4 (>|θs2|), the theoretical specific stroke Cf with respect to the steering angle θs coincides with the actual specific stroke Cf. Therefore, two angle ranges are set based on an experiment that is performed taking into account the dimensional tolerance or assembly tolerance of the component members of the EPS 1. A first angle range R1 is represented by the following expression (B), and a second angle range R2 is represented by the following expression (C).

$$0 \leq |\theta s| \leq |\theta s5| \quad (B)$$

$$|\theta s4| \leq |\theta s| \leq |\theta s3| \quad (C)$$

The second neutral point calculating circuit 72 calculates the motor neutral point θm02 based on the above expression (A) when the steering angle θs detected by the steering sensor 33 reaches an angle in the first angle range R1, or an angle in the second angle range R2. Further, the second neutral point calculating circuit 72 generates a notification signal S indicating whether calculation of the motor neutral point θm02 has been completed.

Note that, after calculating the motor neutral point θm02 once, the second neutral point calculating circuit 72 stops calculation of the motor neutral point θm02. That is, even if the steering angle θs detected by the steering sensor 33 reaches again an angle in a predetermined angle range (R1, R2) after calculating the motor neutral point θm02, the second neutral point calculating circuit 72 does not calculate again the motor neutral point θm02.

The switching circuit 73 acquires the notification signal S generated by the second neutral point calculating circuit 72. When the notification signal S indicates that calculation of the motor neutral point θm02 has not been completed, the switching circuit 73 supplies the motor neutral point θm01 calculated by the first neutral point calculating circuit 71 to the absolute angle calculating circuit 74. When the notification signal S indicates that calculation of the motor neutral point θm02 has been completed, the switching circuit 73 supplies the motor neutral point θm02 calculated by the second neutral point calculating circuit 72 to the absolute angle calculating circuit 74.

The absolute angle calculating circuit 74 calculates the absolute steering angle θsab based on the rotation angle θm of the motor 23, using the motor neutral point θm01 or the motor neutral point θm02 provided from the switching circuit 73. The absolute angle calculating circuit 74 uses the motor neutral point θm01 or the motor neutral point θm02 as a reference point, and calculates the rotation angle θm of the motor 23 as an absolute angle in a range exceeding 360°, based on the amount of change in the rotation angle θm of the motor 23 from the reference point.

The motor 23 and the steering shaft 3 are interlocked via the first rack-and-pinion mechanism 11, the second rack-and-pinion mechanism 27, and the speed reduction mechanism 24. Therefore, there is a correlation between the rotation angle θm of the motor 23 and the steering angle θs representing the rotation angle of the steering shaft 3 (steering wheel 2). Accordingly, the absolute steering angle $\theta$sab can be calculated based on the rotation angle $\theta$m of the motor 23.

According to the present embodiment, the following effects can be obtained.

(1) The ECU 22 relearns the motor neutral point when the steering angle $\theta$s detected by the steering sensor 33 reaches a value in the angle range (R1, R2) in which the specific stroke Cf is constant with respect to the steering angle $\theta$s. That is, the ECU 22 uses the motor neutral point $\theta$m02 calculated by the second neutral point calculating circuit 72 as the reference point for calculating the absolute steering angle $\theta$sab, in place of the motor neutral point $\theta$m01 calculated by the first neutral point calculating circuit 71.

Here, the motor neutral point $\theta$m02 is calculated by the second neutral point calculating circuit 72 when the steering angle $\theta$s detected by the steering sensor 33 falls within the first angle range R1 or the second angle range R2 in which the theoretical specific stroke Cf coincides with the actual specific stroke Cf. Therefore, compared to the motor neutral point $\theta$m01 calculated by the first neutral point calculating circuit 71, the motor neutral point $\theta$m02 calculated by the second neutral point calculating circuit 72 is less affected by the dimensional tolerance or assembly tolerance of the component members of the EPS 1.

Accordingly, the difference between the motor neutral point $\theta$m02 calculated by the second neutral point calculating circuit 72 and the actual motor neutral point is minimized. In other words, the motor neutral point $\theta$m02 calculated by the second neutral point calculating circuit 72 has a value more approximated to the actual motor neutral point. Further, after the motor neutral point $\theta$m02 is calculated by the second neutral point calculating circuit 72, the calculated motor neutral point $\theta$m02 is used. Therefore, the calculation accuracy of the absolute steering angle $\theta$sab based on the rotation angle $\theta$m of the motor 23 can be further improved.

(2) The motor neutral point is relearned through software by the second neutral point calculating circuit 72. Therefore, it is possible to improve the calculation accuracy of the motor neutral point, and hence the absolute steering angle $\theta$sab based on the rotation angle $\theta$m of the motor 23, without adding any hardware to the ECU 22 or the steering mechanism 20.

(3) Immediately after the drive source for driving the vehicle is started, the first neutral point calculating circuit 71 calculates the motor neutral point $\theta$m01, regardless of whether the steering angle $\theta$s falls within an angle range (R1, R2) in which the specific stroke Cf is constant. Therefore, the ECU 22 can promptly use the absolute steering angle $\theta$sab based on the rotation angle $\theta$m of the motor 23. Further, after a more accurate motor neutral point $\theta$m02 is calculated by the second neutral point calculating circuit 72, the ECU 22 uses the motor neutral point $\theta$m02 calculated by the second neutral point calculating circuit 72, and thereby can calculate the absolute steering angle $\theta$sab more accurately. This makes it possible to secure the calculation accuracy of the steering absolute angle $\theta$sab, while enabling quick response to execution of control on the EPS 1 using the absolute steering angle $\theta$sab.

The present embodiment may be modified as described below.

In the present embodiment, the absolute angle of multiple rotations of the motor 23 exceeding 360° is calculated based on the rotation angle $\theta$m (relative angle) of the motor 23, using the motor neutral point $\theta$m01 or $\theta$m02 as a reference, and the absolute steering angle $\theta$sab is calculated based on the calculated absolute angle of the motor 23. However, the absolute angle of the motor 23 calculated using the motor neutral point $\theta$m01 or $\theta$m02 as a reference may be the absolute steering angle (so-called control steering angle) to be used for control by the EPS 1.

In the present embodiment, the steering angle calculating circuit 70 is included in the current command value calculating circuit 51. However, the steering angle calculating circuit 70 may be provided as a separate calculating circuit from the current command value calculating circuit 51. In the present embodiment, the switching circuit 73 and the absolute angle calculating circuit 74 of the steering angle calculating circuit 70 are provided as separate calculating circuits. However, the absolute angle calculating circuit 74 may have the function of the switching circuit 73.

In the present embodiment, the manner in which the specific stroke Cf varies with the steering angle $\theta$s may be appropriately changed according to the product specifications of the EPS 1 or the like. For example, the specifications of the first rack teeth 5a may be changed such that the specific stroke Cf continuously increases or continuously decreases as the absolute value of the steering angle $\theta$s increases in the angle range from the first steering angle $\theta$s1 to the third steering angle $\theta$s3 in the graph of FIG. 6. In this case, the second neutral point calculating circuit 72 calculates the motor neutral point $\theta$m02 when the steering angle $\theta$s falls within the first angle range R1.

In the present embodiment, the steering assist mechanism 21 converts the rotation of the motor 23 into a reciprocating motion of the rack shaft 5 via the second rack-and-pinion mechanism 27. However, the steering assist mechanism 21 may convert the rotation of the motor 23 into a reciprocating motion of the rack shaft 5 via other power conversion mechanisms such as a ball screw mechanism.

In the present embodiment, the first neutral point calculating circuit 71 and the second neutral point calculating circuit 72 may calculate the motor neutral points $\theta$m01 and $\theta$m02, respectively, taking into account not only the specific stroke Cf with respect to the steering angle $\theta$s, but also the torsion amount of the torsion bar 31a. The torsion amount of the torsion bar 31a is calculated based on, for example, the steering torque Th and an elastic coefficient of the torsion bar 31a. In this manner, the motor neutral points $\theta$m01 and $\theta$m02 can be calculated more accurately.

In the present embodiment, the ECU 22 calculates the conversion value $\theta$sm of the steering angle $\theta$s detected by the steering sensor 33, by referring to the conversion map Mc. However, other methods may be used to calculate the conversion value $\theta$sm. For example, the ECU 22 may calculate the conversion value $\theta$sm based on a function expression containing the steering angle $\theta$s detected by the steering sensor 33 as a variable.

In the present embodiment, the first neutral point calculating circuit 71 calculates the motor neutral point $\theta$m01 immediately after the drive source for driving the vehicle is started. However, the time when the first neutral point calculating circuit 71 calculates the motor neutral point $\theta$m01 may be appropriately changed. For example, the first neutral point calculating circuit 71 may calculate the motor neutral point $\theta$m01 after the elapse of a predetermined time from when the drive source for driving the vehicle is started.

In the present embodiment, the second neutral point calculating circuit 72 may calculate the motor neutral point $\theta$m02 every time the steering angle $\theta$s detected by the steering sensor 33 reaches an angle in the predetermined angle range (R1, R2). In this case, every time the motor neutral point $\theta$m02 is calculated by the second neutral point calculating circuit 72, the absolute angle calculating circuit 74 updates the value of the motor neutral point to be used for calculating the absolute steering angle θsab.

In the present embodiment, immediately after the drive source for driving the vehicle is started, when the steering angle θs detected by the steering sensor 33 falls within the predetermined angle range (R1, R2), the second neutral point calculating circuit 72 does not have to perform calculation of the motor neutral point θm02. When the steering angle θs detected by the steering sensor 33 falls within the predetermined angle range (R1, R2), the specific stroke Cf with respect to the steering angle θs does not change, and therefore the accuracy of the motor neutral point θm01 calculated by the first neutral point calculating circuit 71 is secured.

In the present embodiment, an angle range in which the second neutral point calculating circuit 72 performs calculation of the motor neutral point θm02 is set to the angle range (R1, R2) in which the specific stroke Cf is constant with respect to the steering angle θs. However, if a difference 8 (see FIG. 6) between the theoretical specific stroke Cf and the actual specific stroke Cf with respect to the steering angle θs falls within an allowable range for the steering angle θs based on the product specifications of the EPS 1 or the like, the angle range in which the second neutral point calculating circuit 72 performs calculation of the motor neutral point θm02 may be set to include an angle range in which the difference 8 within the allowable range may arise.

Thus, the motor neutral point θm02 is calculated when the steering angle θs detected by the steering sensor 33 falls within a predetermined angle range in which the difference 8 between the theoretical specific stroke Cf and the actual specific stroke Cf falls within an allowable range for the steering angle θs. Therefore, the difference between the motor neutral point θm02 calculated using the conversion value θsm and the actual motor neutral point also falls within an allowable range. Accordingly, by using the motor neutral point θm02 calculated by the second neutral point calculating circuit 72, it is possible to secure the calculation accuracy of the absolute steering angle θsab based on the rotation angle θm of the motor 23 detected by the relative angle sensor 26.

In the present embodiment, the second neutral point calculating circuit 72 may calculate the motor neutral point θm02 only when the steering angle θs detected by the steering sensor 33 falls within the first angle range R1 or only when the steering angle θs falls within the second angle range R2. A determination of whether the steering angle θs falls within the first angle range R1 is made taking into account the absolute value of the fifth steering angle θs5. A determination of whether the steering angle θs falls within the second angle range R2 is made taking into account the absolute value of the fourth steering angle θs4.

In the present embodiment, the steering angle calculating circuit 70 does not have to include the first neutral point calculating circuit 71. In this case, the steering angle calculating circuit 70 does not have to include the switching circuit 73 either. In the present embodiment, the second rack-and-pinion mechanism 27 may be a variable gear ratio type. That is, the specifications of the second rack teeth 5b are set to vary with the axial position on the rack shaft 5. Therefore, the specific stroke (the moving distance of the rack shaft 5 during one rotation of the pinion shaft 25 and hence the motor 23) varies with the rotation angle of the pinion shaft 25 and hence the motor 23. In this case, the conversion value θsm of the conversion map Mc is set taking into account the theoretical specific stroke with respect to rotation of the pinion shaft 9, and the theoretical specific stroke with respect to rotation of the pinion shaft 25 (motor 23). Thus, even when the specific stroke with respect to rotation of the pinion shaft 9 differs from the specific stroke with respect to rotation of the pinion shaft 25 (motor 23), it is possible to appropriately calculate the conversion value θsm with respect to the steering angle θs, and hence the motor neutral points θm01 and θm02, by using the conversion map Mc.

What is claimed is:

1. A steering control device that controls a motor configured to generate power to be applied to a steering mechanism having a variable gear ratio rack and pinion, based on a command value calculated in accordance with a steering state, the steering control device comprising:
   a first calculating circuit that calculates a first component of the command value in accordance with a steering torque;
   a second calculating circuit that calculates a second component of the command value, as a compensation control amount for the first component, based on a calculated steering angle; and
   a third calculating circuit that calculates a motor neutral point indicating a rotation angle of the motor corresponding to a steering neutral position, by subtracting a conversion value from a rotation angle of the motor detected by a relative angle sensor, the conversion value being calculated by converting a sensed steering angle detected by an absolute angle sensor into a rotation angle of the motor, taking into account a specific stroke, and calculates the calculated steering angle to be used in the second calculating circuit as an absolute angle, based on the calculated motor neutral point and the rotation angle of the motor detected by the relative angle sensor; wherein,
   the third calculating circuit calculates the motor neutral point when the sensed steering angle detected by the absolute angle sensor falls within a predetermined angle range in which a difference between a theoretical specific stroke and an actual specific stroke with respect to the sensed steering angle falls within an allowable range for the sensed steering angle, and
   the third calculating circuit includes
      a first neutral point calculating circuit that (i) calculates a first motor neutral point immediately after a drive source of a vehicle including the steering control device is started and (ii) stops calculation of the first motor neutral point after calculating the first motor neutral point only once each time the vehicle is started,
      a second neutral point calculating circuit that (i) calculates a second motor neutral point only in response to detecting that the sensed steering angle detected by the absolute angle sensor falls within the predetermined angle range and (ii) generates a signal indicating calculation of the second motor neutral point in response to calculating the second motor neutral point,
      a switching circuit that outputs the first motor neutral point as the motor neutral point until receiving the signal indicating calculation of the second motor neutral point, and outputs the second motor neutral point as the motor neutral point in response to receiving the signal indicating calculation of the second motor neutral point, and
      an absolute angle calculating circuit that calculates the calculated steering angle to be used in the second calculating circuit as an absolute angle, using the motor neutral point output by the switching circuit.

2. The steering control device according to claim 1, wherein,
- in a first region in the vicinity of the steering neutral position where an absolute value of the sensed steering angle is less than or equal to a first steering angle, the specific stroke is set to be constant at a first specific stroke;
- in a second region where the absolute value of the sensed steering angle is greater than the first steering angle and is less than or equal to a second steering angle, the specific stroke is set to gradually increase as the absolute value of the sensed steering angle increases;
- in a third region in the vicinity of a steering limit position where the absolute value of the sensed steering angle is greater than the second steering angle, the specific stroke is set to be constant at a second specific stroke; and
- the predetermined angle range includes at least one of a first angle range in the vicinity of a steering angle corresponding to the steering neutral position, and a second angle range in the vicinity of a steering angle corresponding to the steering limit position.

3. The steering control device according to claim 1, wherein,
- immediately after the drive source for driving the vehicle is started, when the sensed steering angle detected by the absolute angle sensor falls within the predetermined angle range, the second neutral point calculating circuit does not perform calculation of the motor neutral point.

4. The steering control device according to claim 1, wherein the second neutral point calculating circuit is configured to, after calculating the second motor neutral point, slop calculation of the second motor neutral point.

5. The steering control device according to claim 1, wherein,
- the rack and pinion includes a pinion shaft that rotates in conjunction with operation of a steering wheel, and a steered shaft that reciprocates in an axial direction in accordance with rotation of the pinion shaft; and
- based on a premise that rotation of the motor is applied to the steered shaft via a speed reduction mechanism, a specific stroke with respect to rotation of the pinion shaft differs from a specific stroke with respect to rotation of the motor.

* * * * *